(12) United States Patent
Randall

(10) Patent No.: X1642
(45) Date of Patent: Jan. 11, 1812

(54) WRITING,MODE OF TEACHING

(76) Inventor: Samuel Randall

Samuel Randall

Letters Patent

The schedule referred to in these Letters Patent and making part of the same containing a description in the words of the said Samuel Randall himself of his mode of teaching to write The Skeletons (or form) of Letters Figures &c are formed on paper by colouring all parts of it except the Skeleton (or form of the Letters &c). all parts of the paper are to be coloured except where the pen is to be drawn to form the Letter or figure or at least so much of it coloured as will render the skeleton or form; at once discernable to the practitioner or pupil. This is done by engraving whatever is desired should be written on the surface of any kind of metal. the colouring is then spread over said surface. the paper is then laid and pressed upon it which will colour all parts of the paper except the engraving [in the engraving there will be no ink] these skeletons the pupil is to trace with a pen. These skeletons may be formed any other way which experience shall prove more expedient. The above I hereby acknowledge to be the description of the improvement under consideration Witnesses
Paul Ware
George Sandey Samuel Randall